Sept. 21, 1926.
J. A. JOHNSON
1,600,284
CLEAR VISION WINDOW FOR LOCOMOTIVE CAB DOORS
Filed Nov. 12, 1925
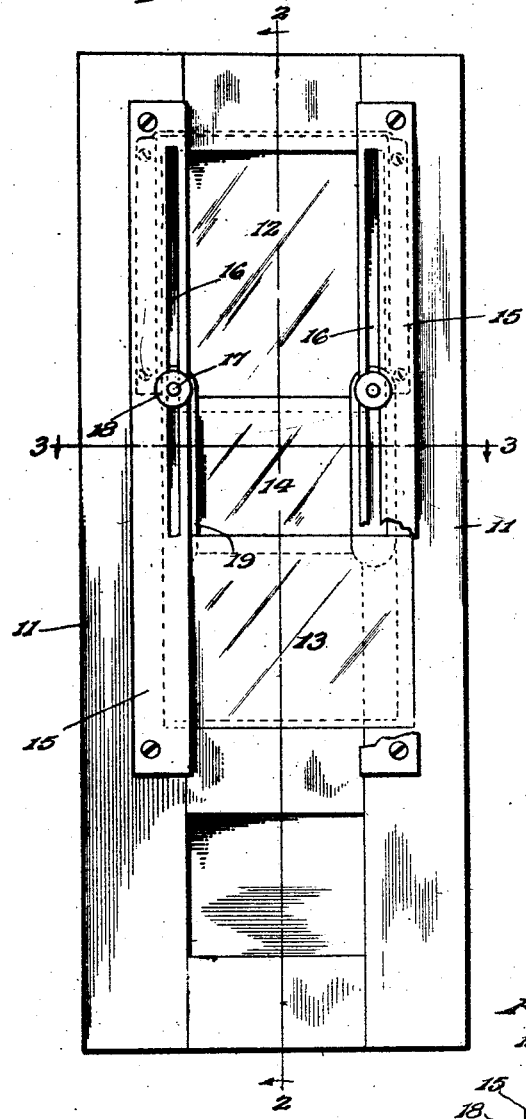
Inventor
J. A. Johnson.
By Lacy & Lacy, Attorneys Patented Sept. 21, 1926.

1,600,284

UNITED STATES PATENT OFFICE.

JOHN A. JOHNSON, OF NORTH LITTLE ROCK, ARKANSAS.

CLEAR-VISION WINDOW FOR LOCOMOTIVE CAB DOORS.

Application filed November 12, 1925. Serial No. 68,669.

The invention relates to windows and more particularly to closing means for the window of a locomotive cab door which admits of a clear vision under all conditions and which is adapted for tall, short and medium height engineers when occupying the usual standard seat box.

The invention provides a window of the class aforesaid which is adjustable up or down from a normal position to provide a clear vision above or below the adjustable glass or equivalent part and which will exclude rain, sleet and the like as the several sections overlap in a manner to shed moisture upon the outside of the door.

The invention furthermore aims to provide a window which is unobstructed by bars or other projecting parts and which may be readily adapted to doors of any width by obtaining a glass of proper size.

While the drawings illustrate a preferred embodiment of the invention it is to be understood that in adapting the means to meet specific needs and requirements the design may be varied, and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is an elevational view of a locomotive cab door provided with a clear vision window embodying the invention as seen from the inner or rear side, Figure 2 is a vertical transverse sectional view on the line 2—2 of Figure 1 looking in the direction of the arrows, Figure 3 is a horizontal sectional view on the line 3—3 of Figure 1, Figure 4 is a fragmentary sectional view on the line 4—4 of Figure 2 looking downwardly as designated by the arrows, and Figure 5 is a perspective view of one of the slides and an end portion of the glass or equivalent part associated therewith.

Corresponding and like parts are referred to in the following description and designated in the several views of the drawings by like reference characters.

The door illustrated may be of any construction such as usually provided for the cab of a locomotive engine, said door having a window opening 10 in its upper portion which is closed by glass or equivalent material so as to provide for a clear vision without any obstructing cross pieces or projecting parts. The stiles 11 bordering upon opposite sides of the window opening 10 are rabbeted to receive an upper glass 12, a lower glass 13 and an intermediate glass 14. The term "glass" is used in a general sense to include any equivalent transparent material employed in connection with windows. The upper glass 12 and the lower glass 13 are fixed and are disposed in different vertical planes as indicated most clearly in Figure 2 and are spaced apart at their opposing edges leaving an opening which is adapted to be closed by the intermediate glass 14 which is of a size to overlap the glasses 12 and 13 as indicated most clearly in Figure 2. The glass 12 is set nearer the front or outside of the door forwardly of the glass 14 so as to shed moisture and prevent the same from reaching the inner or rear side of the door. The glass 13 is located nearer the inner or rear side of the door in a plane rearwardly of the glass 14 so that the lower portion of the glass 14 overlaps the upper portion of the glass 13 and sheds moisture in a manner to prevent the same reaching the inner or rear side of the door as will be readily appreciated. The intermediate glass 14 is adjustable vertically up or down from a normal position as indicated in Figure 2 and is adapted to be held in an adjusted position.

Strips 15 are attached to the rear sides of the stiles 11 and serve as means to secure the glass 13 in place and also to provide guides for the adjustable glass 14 and these strips are formed with slots 16 to receive threaded stems 17 upon which are mounted thumb nuts 18. A slide 19 cooperates with each of the stiles 11 and strips 15 and consists of a bar of a length to receive the glass 14, said slide having a recess 20 in its inner vertical edge to snugly receive the adjacent marginal edge portion of the glass 14 as indicated most clearly in Figure 3. The slide operates in a groove or channel 21 formed in the inner vertical edge of the stile 11. Each of the slides 19 is provided at its upper end with a threaded stem 17 which passes through the guide slot 16 of the adjacent strip 15 and receives a thumb nut 18 upon its projecting end. The thumb nuts 18 provide convenient means for adjusting the glass 14 and also serve as locking means in conjunction with the strips 15 to secure the slides 19 in the required adjusted position, said thumb nuts when tightened gripping the strips 15 and securing the slides 19.

It is observed that the invention is of a nature to be readily applied to the door of any locomotive engine cab and insure a clear and unobstructed vision because of the absence of cross bars or other projecting parts, and moreover, vertical adjustment of the slides 19 up or down from a normal position admits of an opening being provided above or below the slides as may be best adapted to the height of the engineer when occupying the standard seat box. To further shed moisture a hood 22 is disposed upon the outside of the door above the window opening as indicated most clearly in Figure 2, said hood extending across the top of the window opening and down along the sides thereof for a short distance.

Having thus described the invention, I claim:

1. A cab door having a window opening, upper and lower glasses fitted in the window opening and arranged in different vertical planes and spaced apart to provide an intermediate opening, a sliding glass for closing the said intermediate opening and adapted to occupy a position wholly in the rear of the upper glass or wholly in front of the lower glass and movable in a plane intermediate of and parallel with planes coinciding with the said upper and lower glasses, and means for adjusting the sliding glass to leave an opening above its top or below its bottom edge and securing it in the adjusted position.

2. A cab door having a window opening, upper and lower glasses in the window opening, having their opposing ends spaced apart to provide a sight opening, guides at opposite sides of the window opening, slides on said guides, a glass adapted to cover the said sight opening and attached at its vertical edges to the said slides and movable therewith to a position wholly above or entirely below the said sight opening to leave an unobstructed opening below the upper glass or above the lower glass, and means for securing the movable glass in the desired adjusted position.

3. A door having a window opening, upper and lower glasses closing the top and the bottom portions respectively of the window opening and disposed the one forwardly of the other, longitudinally slotted strips at opposite sides of the window opening, slides mounted upon the strips and having recesses in their opposing sides, means associated with the slides and strips for operating and securing the slides in the required adjusted position and a glass having opposite marginal edge portions fitted in the recesses of the slides and adjustable with the latter and disposed to occupy a position in the rear of the upper glass, or in the front of the lower glass to expose the said opening or a part thereof, either above or below the adjustable glass.

In testimony whereof I affix my signature.

JOHN A. JOHNSON. [L.S.]